June 18, 1963  E. B. JACOBSON  3,094,582
REMOTE CONTROL FOR REARVIEW MIRRORS AND THE LIKE
Filed Sept. 28, 1959
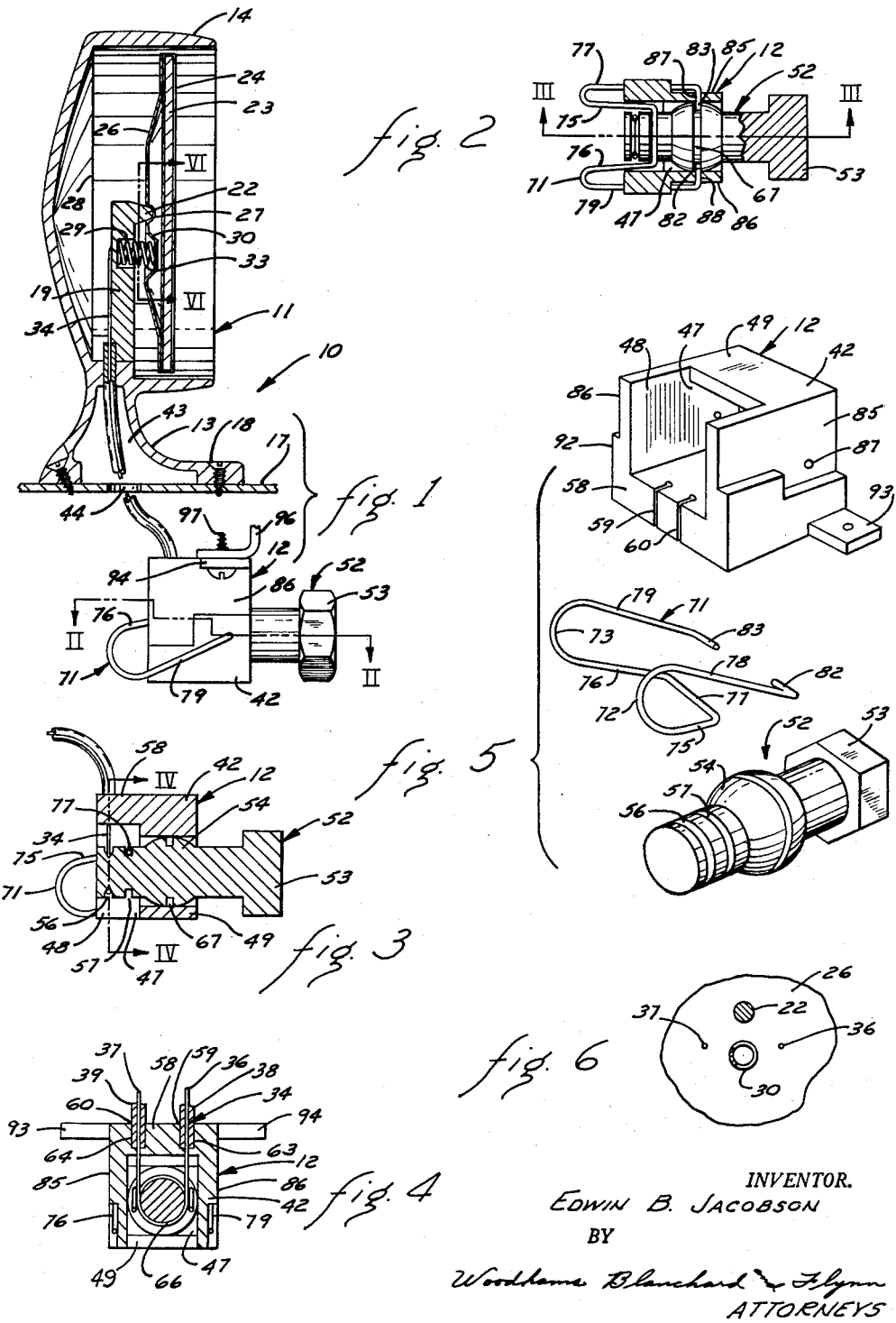
INVENTOR.
EDWIN B. JACOBSON
BY
Woodhams Blanchard & Flynn
ATTORNEYS

United States Patent Office 3,094,582
Patented June 18, 1963

3,094,582
REMOTE CONTROL FOR REARVIEW MIRRORS
AND THE LIKE
Edwin B. Jacobson, Grand Rapids, Mich., assignor to
Jervis Corporation, Grandville, Mich., a corporation of
Michigan
Filed Sept. 28, 1959, Ser. No. 842,916
4 Claims. (Cl. 88—93)

This invention relates in general to an adjustable rearview mirror assembly including a reflective member supported for pivotal movement around a pair of transverse axes and, more particularly, to a manually operable control device for remotely controlling the adjustment of the reflective member in said mirror assembly by means of a pair of elongated flexible elements which are connected between said control device and said reflective member.

A rearview mirror assembly having a reflective member which can be remotely adjusted by a simple manually operable device has many advantages which are well known. For example, such an assembly permits the mounting of the reflective member in a variety of positions and locations which are spaced from the viewing position, such as the operator's position in an automotive vehicle, while permitting the operator to adjust the reflective member without leaving such position. Other advantages of a rearview mirror assembly, having a remotely adjustable reflective member, particularly where two elongated flexible elements are used in combination with a reaction member, are set forth in greater detail in the copending application Serial No. 818,669, filed June 8, 1959 and assigned to the assignee of this application.

The present invention developed from a continuing effort to further develop an improved remotely controlled reflective device for automotive uses.

Accordingly, the primary object of this invention has been the provision of an improved adjustable rearview mirror assembly having a reflective member pivotally supported for movement around either or both of a pair of transverse axes by means of a pair of elongated, flexible and substantially co-extensive elements which are connected to and between said reflective member and an improved manually operable control device characterized by its simplicity of construction and operation as well as its easy, accurate and reliable responsiveness to actuation.

A further object of this invention has been the provision of a mirror assembly, as aforesaid, which can be produced inexpensively, which is easy to install without special tools, which requires little or no maintenance even under conditions of rigorous use, which can be easily disassembled for the purpose of relocation or replacement of damaged parts and which can be operated with ease and accuracy from the operator's position in an automotive vehicle.

A further object of this invention has been the provision of a rearview mirror assembly, as aforesaid, which is pleasing in appearance, which is rugged in construction, which will tend to remain in adjustment after being properly adjusted even where the conditions of its operation produce shocks and vibrations which would normally cause existing rearview mirrors to be moved out of adjustment.

Other objects and purposes of this invention will become apparent to persons familiar with this type of equipment upon reading the following specification and examining the accompanying drawings, in which:

FIGURE 1 is a partially broken and partially central cross-sectional view of a rearview mirror assembly including a device for remotely controlling the reflective member and embodying the invention.

FIGURE 2 is a sectional view substantially as taken along the line II—II in FIGURE 1.

FIGURE 3 is a sectional view taken along the line III—III in FIGURE 2.

FIGURE 4 is a sectional view taken along the line IV—IV in FIGURE 3.

FIGURE 5 is an exploded, oblique view of the control device substantially as appearing from the lower side thereof.

FIGURE 6 is a sectional view substantially as taken along the line VI—VI in FIGURE 1.

For the purpose of convenience in description, the terms "upper," "lower" and derivatives thereof will have reference to the rearview mirror assembly and parts thereof as appearing in FIGURE 1. The terms "front," "rear" and derivatives thereof, as applied to the mirror assembly, will have reference to the normal direction of movement of the vehicle upon which the assembly is mounted. The terms "inner," "outer" and derivatives thereof will have reference to the geometric center of said mirror assembly and parts thereof.

*General Description*

The objects and purposes of the invention, including those set forth above, have been met by providing an adjustable rearview mirror assembly comprised of a reflective member supported upon a desired portion of the vehicle, such as a fender, and a control device which may be mounted upon the instrument panel of the vehicle near the operator's position. The reflective member is connected to the control device by a pair of elongated, flexible and substantially co-extensive elements which are normally held under continuous tension. The reflective member is mounted within a hood upon a support structure for pivotal movement around a pair of transverse axes.

The control device includes a manually operable lever supported for rotational movement around a first axis and pivotal movement around a second axis which is preferably substantially perpendicular to the first axis. Accordingly, rotational movement of the lever effects pivotal movement of the reflective member around one of said axes and pivotal movement of the lever effects pivotal movement of the reflective member around the other of said axes. In this particular embodiment, the elongated flexible elements are two substantially equal parts of the same cable which is engaged approximately midway between the ends thereof by the lever of the control device. The elongated flexible elements are associated with some form of friction member, such as a pair of casings arranged respectively around each element, and which extends between the structure for supporting the reflective member and the base of the control device. Resilient means is preferably associated with both the reflective member and the lever for the purpose of holding the elongated elements continuously under tension. Thus, sufficient friction is developed between the elongated elements and the casings whereby the reflective member will tend to remain in its adjusted position without adversely affecting the ease of operation of the control device. The reflective member and the lever have median positions from which they can be adjusted to effect pivotal movement of said reflective member in any direction.

*Detailed Construction*

The rearview mirror assembly 10 (FIGURE 1), which has been selected to illustrate a preferred embodiment of the invention, is comprised of a slave unit 11 and a control device 12 which are normally spaced a substantial distance from each other. The slave unit 11 includes a pedestal 13 having an integral hood 14 supported thereon. The pedestal 13 may be supported upon means, such as the front fender 17 of a vehicle, by means of the screws 18. A support post 19 is mounted upon and within the hood 14 adjacent to the pedestal 13. Said support post has near its upper end a rearwardly extending pivot projection 22 which is preferably substantially coaxial with the hood 14. A reflective member 23 which is disposed within the hood 14 has a rearwardly facing reflective surface 24 and a back plate 26. Said back plate 26 has a pivot recess 27, preferably near the center thereof, into which the pivot projection 22 is pivotally received. The support post 19 and reflective member 23 are arranged and constructed so that said reflective member can pivot in any direction around pivot projection 22 from a median position wherein the reflective surface 24 is substantially parallel with the rear vertical edge 28 of the hood 14. A pair of spring recesses 29 and 30 are provided in the opposing surfaces of the support post 19 and back plate 26, respectively, at points thereon spaced equidistantly from the pivot projection 22 and pivot recess 27, respectively. A spiral spring 33 is disposed within and between the recesses 29 and 30 and is preferably under slight compression when the reflective member 23 is in its said median position.

An elongated flexible and substantially non-stretchable cable 34 (FIGURES 1 and 4) is folded upon itself approximately midway between its ends to provide a pair of substantially co-extensive, flexible control elements 36 and 37.

The free ends of the control elements 36 and 37 are secured to the back plate 26 (FIGURE 6) at points thereon preferably spaced equidistant from the center of both the pivot recess 27 and spring recess 30 so that they define a horizontal line passing between and spaced from the centers of both said pivot recess 27 and spring recess 30.

The control elements 36 and 37 are slidably disposed respectively within a pair of preferable co-extensive casings 38 and 39 which extend between the support post 19 and the base member 42 of the control device 12. The front ends of the casings 38 and 39 are received through an opening 43 through the pedestal 13 and abut against support post 19 whereby further forward movement of said casings toward the reflective member 23 is positively prevented. The front ends of the control elements 36 and 37 extend through and beyond the front ends of the casings 38 and 39 and are slidably guided by the support post 19 into the above-mentioned engagement with the back plate 26. The casings 38 and 39 with their control elements 36 and 37 extend through an appropriate opening 44 in the fender 17.

The base member 42 (FIGURES 2, 3 and 4) is preferably substantially rectangular in shape and has a passageway 47 extending therethrough. Said passageway is in this particular embodiment substantially rectangular and has a vertically enlarged portion 48 at its front end which extends through the bottom wall 49 of the base member 42. An elongated lever 52 has a manually engageable head 53 at its rearward end and a spherical enlargement 54 between its ends, said spherical enlargement preferably having the same diameter as the inscribed circle of the passageway 47, which passageway is preferably square in cross-section. Accordingly, the lever 52 can be rotated in both directions or pivoted in any direction within the passageway 47. The front end of the lever 52 has a pair of spaced annular grooves 56 and 57 which are disposed within the enlarged portion 48 of the passageway 47. The top wall 58 of the base member 42 has a pair of openings 59 and 60 through which the control elements 36 and 37 are slidably receivable. Said openings 59 and 60 have enlarged portions 63 and 64 at the upper ends thereof into which the rearward ends of the casings 38 and 39 are slidably received and their axes are aligned with the diametrically opposite sides of the front groove 56. Accordingly, the closed end or loop 66 of the cable 34 disposed within the enlarged portion 48 of the passageway 47 can be arranged around the front end of the lever 52 and disposed within the front groove 56. As shown in FIGURE 5, the control element openings 59 and 60 on the top wall 58 are preferably in the form of slots which open through the front edge of the top wall 58. This arrangement facilitates assembly and disassembly of the unit as will appear hereinafter.

The lever 52 has a further groove 67 thereon which groove preferably defines a plane passing through the center of the spherical enlargement 54 and is positioned perpendicular to the lengthwise axis of the lever. A resilient device, such as the spring member 71, is supported within the base member 42 for the dual purpose of releasably holding the lever 52 in its proper operating position and of resiliently urging the front end of the lever 52 away from the top wall 58 of the base member 42. The spring member 71 (FIGURES 2 and 5) is comprised of a pair of substantially identical, U-shaped elements 72 and 73 which are mirror images of each other. The spring elements 72 and 73 have a pair of relatively short legs 75 and 76, the ends of which are connected to, and preferably integral with, the opposite ends of a cross rod 77. The spring elements 72 and 73 have a pair of relatively long legs 78 and 79, respectively, which are bent toward each other at their free ends to provide the preferably coaxial pivot rods 82 and 83.

The side walls 85 and 86 of the base member 42 have coaxial openings 87 and 88 which communicate toward the passageway 47 approximately midway between the upper and lower walls thereof. The pivot rods 82 and 83 are slidably disposed within the openings 87 and 88, respectively (FIGURE 2), so that their inner ends extend into the passageway 47 for reception into the annular groove 67 on the spherical enlargement 54 of the lever 52. Simultaneously, the cross rod 77 and adjacent portions of the short legs 75 and 76 are received into the enlarged portion 48 of the passageway 47 and the cross rod 77 is slidably disposed within the upper portion of the center annular groove 57. The side walls 85 and 86 have outwardly extending, integral bosses 91 and 92 which extend outwardly therefrom between the openings 87 and 88, respectively, and the front end of the base member 42. The long legs 78 and 79 of the spring member 71 are disposed adjacent to the side walls 85 and 86, respectively, below the bosses 91 and 92 whereby upward movement of the front end of the lever 52 can be effected only by spreading the short legs 75 and 76 away from the long legs 78 and 79 against the contrary urging thereof.

The base member 42 also has a pair of mounting flanges 93 and 94 whereby the control device 12 can be mounted upon the lower edge of an instrument panel 96 within the operator's compartment of an automotive vehicle by means such as the screws 97.

*Assembly and Operation*

The mirror assembly 10 to which this invention relates, is assembled by mounting the slave unit upon means such as the fender 17 adjacent to an opening 44 therethrough. The control elements 36 and 37 with their casings 38 and 39 are inserted through the opening 44 to a point adjacent the instrument panel 96 in the operator's compartment of a vehicle. The control unit 12 is preassembled as above described and shown in the drawings previous to its being received by the person mounting it on the car and it is mounted in its desired position of use.

The closed end or loop 66 of the cable 34 is then manually grasped and pulled rearwardly with respect to the casings 38 and 39 so that the rearward ends of the control elements 36 and 37, adjacent thereto, can be slidably inserted into the control element openings or slots 59 and 60 in the top wall 58 of the base member 42 and the loop 66 placed in groove 56. At the same time, the rearward ends of the casings 38 and 39 are slidably disposed within the enlarged upper ends 63 and 64 of the element openings 59 and 60, and the mirror assembly 10 is ready for operation.

The pivotal movement of the reflective member 23 around a substantially horizontal axis as appearing in FIGURE 1, is effected by pivoting the lever 52 around a horizontal axis defined by the pivot rods 82 and 83. More specifically, by manually depressing the rear end of the lever 52, its front end is moved upwardly against the contrary urging of the spring member 71. Such upward movement permits the control elements 36 and 37 to move through the casings 38 and 39, respectively, and simultaneously in response to the urging of the spiral spring 33, thereby causing the reflective member 23 to pivot around its horizontal axis, whereby the reflective member rotates counterclockwise, as seen in FIGURE 1. A contrary pivoting of the lever 52 around its horizontal axis effects movement of the control elements 36 and 37 in the reverse direction thereby compressing the spiral spring 33 and rotating the reflective member 23 clockwise.

Rotational movement of the lever 52 in one direction causes the cable 34 to be moved around within the front groove 56 in the lever 52 thereby causing the control elements 36 and 37 to move in opposite directions. This movement of the control elements results in a pivotal movement in one direction of the reflective member 23 upon the pivot projection 22 around a substantially vertical axis. Reverse rotational movement of the lever 52 produces pivotal movement of the reflective member 23 around said vertical axis in the opposite direction. It will be apparent that by combining the pivotal and rotational movements of the lever 52, the reflective member 23 can be pivoted out of its median position as appearing in FIGURE 1, in any direction around the pivotal engagement between the pivot projection 22 and the pivot recess 27 on the back plate of the reflective member 23. The spiral spring 33 and spring member 71 will continually cooperate to hold the control elements 36 and 37 under tension within the casings 38 and 39. Accordingly, due to the friction between the casings and the control elements, both the reflective member 23 and the lever 52 will tend to remain in any adjusted position into which they are placed.

Although a particular preferred embodiment of the invention has been disclosed in detail above for illustrative purposes, it will be understood that variations or modifications of such disclosure, which lie within the scope of the appended claims, are fully contemplated.

What is claimed is:

1. Mechanism for supporting and adjusting a rearview mirror, comprising in combination: a reflective member; a support structure provided with a pivot point pivotally supporting said reflective member for movement about first and second axes; said axes being substantially perpendicular to each other and passing through the pivot point between said support structure and said reflective member; a control base spaced remotely from said support structure; a lever pivotally and rotatably supported upon said control base; a pair of cables connected at one end of each thereof to said reflective member at points on opposite sides of one of said axes and said points being on the same side of the other of said axes, and the other ends of said cables engaging said lever for simultaneous movement therewith in the same direction with respect to each other upon pivotal movement of said lever and rotation of said lever effecting simultaneous movement of said cables in the opposite direction with respect to each other; whereby a combination of rotational and pivotal movement of said lever will effect universal movement of said reflective member about said first and second axes through said pivot and a resilient means connected between said control base and said lever applying a fixed tension to said cables.

2. Mechanism for supporting and adjusting a rearview mirror, comprising: a reflective member; a support structure pivotally supporting said reflective member on the side opposite the reflective surface thereof; resilient means disposed between said support structure and said side of said reflective member and spaced from the pivot point of said reflective member, said resilient means urging pivotal movement of said reflective member around the first axis; a control base spaced remotely from said support structure; a lever pivotally and rotatably supported upon said control base; a pair of elongated flexible elements connected at one end to said side of said reflective member at points thereon disposed on opposite sides of a center line connecting said pivot point and said resilient means and on the same side of said pivot point as said resilient means, the other ends of said flexible elements engaging said lever for simultaneous movement therewith in response to pivotal movement thereof and for movement oppositely with respect to each other in response to rotational movement of said lever; resilient means extending between said control base and said lever and resiliently urging pivotal movement of said lever around a second axis in a direction to tension said flexible elements; and reaction means between said support structure and said control base; whereby said first resilient means is held under compression and said lever is urged to pivot in said direction around said second axis.

3. A continuous wire master and slave structure for remotely controlling a rear-view mirror or the like, comprising: a mirror; a mirror retaining plate provided with a central pivot recess and a spring retaining recess below and spaced apart from said pivot recess; a rigid support post in spaced generally parallel relation behind said retaining plate; a pivot projection extending from said support post and into said pivot recess of said retaining plate; a spring intermediate said support post and said retaining plate and located in said spring recess of said plate and providing a fixed spring bias about said pivot; a wire, the two ends of which are passed through said post and secured to the back of said retaining plate in symmetrical spaced relationship on each side of said spring recess and on line between the centers of said spring recess and said pivot recess; a spring centered master control unit having an annular groove receiving a loop of said wire in tension; a housing about said master control unit and having an axial opening and a coaxial enlarged universal control receiving recess therethrough whereby, upon rotation of said control unit, said control unit frictionally alters the position of said wire and whereby axial tilting of said control provides simultaneous coordinated movement of said wire and corresponding equivalent movement of said retaining plate; and sheaths about said wires housed in shouldered compression relation intermediate said post and said master control unit housing.

4. In a remote control for mirrors and the like the combination comprising: a support bracket; a reflective member pivotally and centrally secured to said support bracket for universal movement thereabout; two elongate force transmitting members in spaced apart offset relation from the point of pivoting and secured to said reflective member; a control member remotely spaced from said support bracket and said reflective member; moveable rotatable means pivotally secured to said control member and connected to said force transmitting members whereby pivotal movement of said moveable means causes simultaneous equal forces to be applied to said two elongate force transmitting members thereby causing displacement in said reflective member in accord with similar pivotal movement of said moveable means; a spring acting between said support bracket and said reflective member and offset from pivotal connection as between said reflective member and said support bracket, applying tension to said force transmitting members and tending to return said reflective member to a predetermined position and a separate spring acting on said moveable and rotatable means applying complementing equal tension to said elongate members.

References Cited in the file of this patent

UNITED STATES PATENTS

| | | |
|---|---|---|
| 1,499,640 | Copeland | July 1, 1924 |
| 1,630,217 | Rasor | May 24, 1927 |
| 2,296,367 | Nelson | Sept. 22, 1942 |
| 2,620,708 | Anderson | Dec. 9, 1952 |
| 2,632,363 | Persson | Mar. 24, 1953 |
| 2,696,142 | Langford | Dec. 7, 1954 |
| 2,713,810 | Hill | July 26, 1955 |
| 3,030,821 | Jacobson | Apr. 24, 1962 |

FOREIGN PATENTS

| | | |
|---|---|---|
| 433,112 | Great Britain | Aug. 8, 1935 |